United States Patent

[11] 3,625,435

| [72] | Inventors | James P. Mitchell;<br>Bruce T. Brown, both of North Palm Beach, Fla. |
|---|---|---|
| [21] | Appl. No. | 617,762 |
| [22] | Filed | Feb. 14, 1967 |
| [45] | Patented | Dec. 7, 1971 |
| [73] | Assignee | United Aircraft Corporation<br>East Hartford, Conn. |

[54] DUAL ORIFICE QUADRUPLET IMPINGEMENT INJECTOR
8 Claims, 3 Drawing Figs.

[52] U.S. Cl. .................................................. 239/422, 239/543, 60/39.46
[51] Int. Cl. .................................................. F23d 11/16

[50] Field of Search .......................................... 139/419, 422, 423, 426, 434; 60/39.46, 258

[56] References Cited
UNITED STATES PATENTS
2,405,465  8/1946  Summerfield ................  60/258

*Primary Examiner*—Samuel Feinberg
*Attorney*—Jack N. McCarthy

ABSTRACT: An injector head for two propellants wherein the propellants are fed through internal passageways in the injector head and are ejected from the face of the injector in a quadruplet pattern of openings. The invention herein described was made in the course of or under a contract with the Department of the Air Force.

PATENTED DEC 7 1971 3,625,435
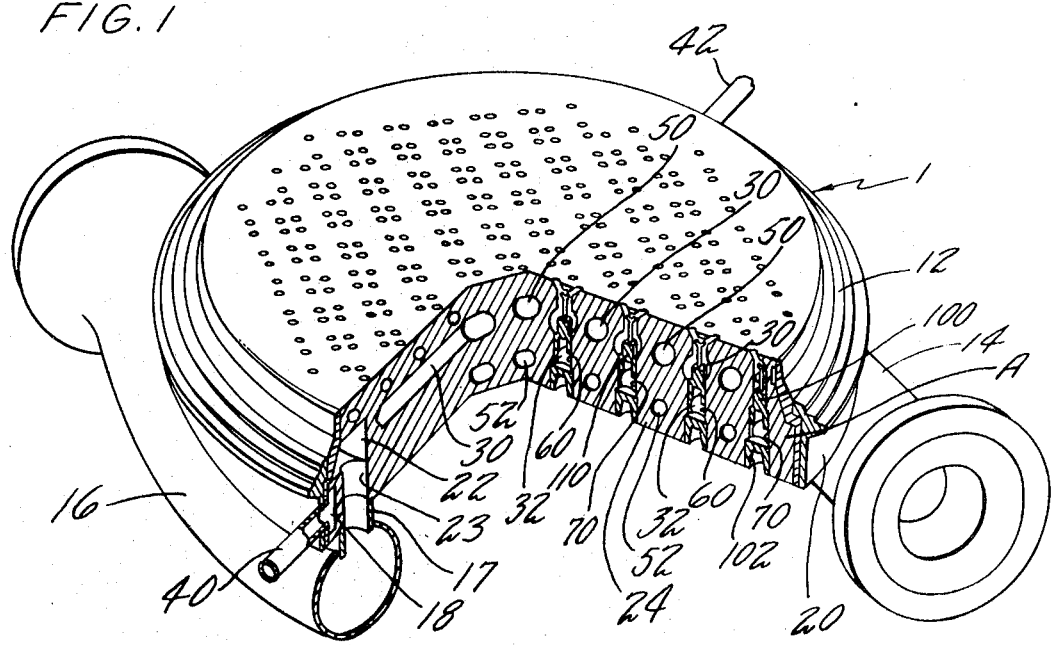
FIG.1
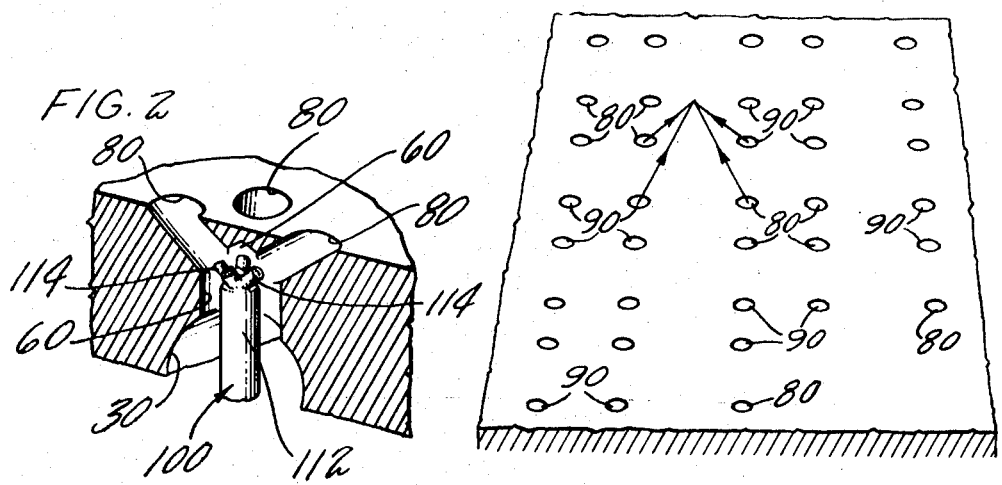
FIG.2
FIG.3
INVENTORS
JAMES P. MITCHELL
BRUCE T. BROWN
BY Jack N. McCarthy
AGENT

DUAL ORIFICE QUADRUPLET IMPINGEMENT INJECTOR

CROSS REFERENCES TO RELATED APPLICATION

Applications which are related to this disclosure are the following:

| Ser. No. | Filed | Title |
|---|---|---|
| 426,711 | 1/15/65 | Dual Orifice Impingement Injector This application is now abandoned. |
| 596,393 | 11/21/66 | Injector Head |

BACKGROUND OF THE INVENTION

Injector requirements are severe for a rocket engine that must throttle continuously over a wide range, and stable combustion and good performance must be provided at all chamber pressures and injector flow rates. This can be accomplished by maintaining high injection velocities and, therefore, providing good propellant mixing and uniform mixture ratio distribution.

While prior art on injectors and injector heads is abundant, all of the injector faces appear to differ from this disclosure. Patents dealing with specific location of propellant openings on an injector face are set forth below:

| Pat. No. | Title | Inventor |
|---|---|---|
| 3,000,184 | Cooled Injector | A.M. Fish |
| 3,122,885 | Injector for Bipropellant Rocket Engines | M.F. Heidmann |

SUMMARY OF THE INVENTION

It is a primary object of this invention to provide an injector head having a pattern of openings which will present the propellants to the combustion chamber in the form most desirable for combustion.

The present invention locates the propellant openings throughout the face in a form wherein a set of quadruplet openings forms an injection unit. This unit includes the injection of one propellant from one pair of openings in opposing corners while injecting the second propellant from the other pair of openings in opposing corners. An arrangement is provided wherein a primary and secondary flow system can be used with each opening or group of openings which ejects the same propellant.

BRIEF DESCRIPTION OF THE DRAWINGS

FIG. 1 is a schematic perspective view of the injector head with a section cut away for clarity.

FIG. 2 is an enlarged view showing the location of the pintle with respect to the mating opening of the injector head.

FIG. 3 is a partial view showing the location of openings on the injector face.

DESCRIPTION OF THE PREFERRED EMBODIMENT

In a conventional liquid rocket engine, propellants are fed into a combustion chamber through an injector head at the forward end of the chamber, then ignited and passed through a nozzle. FIG. 1 shows an injector head 1 with a quadruplet face pattern along with cross sections of the primary and secondary nozzles for each set of four face openings for a like propellant.

The injector head 1 is similar in construction to the injector head of application Ser. No. 426,711, filed Jan. 15, 1965, and now abandoned. The body 24 of the injector head 1 is formed generally circular having a contoured outer circumference which is contoured to receive an outer annular retaining ring 12. A second retainer ring 20 extends around the rear part of the ring 12. The rearwardly facing annular faces of rings 12 and 20 engage the attaching end of a combustion chamber. This combustion chamber can be affixed to the injector head by any means desired. Further, the rings 12 and 20 can be affixed by any desirable means to the body 24.

The body 24 contains two pairs of cooperating grooves 18 and 22 which extend along the outer circumference of the body 24 for a distance short of 180°. This is done so that there are two pairs of grooves which are slightly less than semicircular to form similar diametrically opposed propellant manifolds, one pair for an oxidizer and the other pair for a fuel. As seen in FIG. 1, the groove 22 forms with the ring 12 a secondary fuel manifold and the groove 18 forms with the ring 12 a primary fuel manifold. Not shown, but appearing on the other half of the injector head in the same manner, is the primary oxidizer manifold and the secondary oxidizer manifold. As seen at point A, the edge of the outer circumference of the body 24 fully engages the inner surface of the ring 12. It is at this point that one pair of manifolds is separated from the other. Similarly, the body 24 mates with the ring 12 at a point diametrically opposed from point A.

Fuel is supplied to the secondary fuel manifold formed by the groove 22 and ring 12 by a fuel conduit 16, a plurality of short conduits 17 and mating passageways 23 formed in the body 24. Oxidizer is supplied to the secondary oxidizer manifold on the opposite side of the injector head by an oxidizer conduit 14 along with short conduits and passageways similar to those in the fuel system. Fuel is transmitted from a supply to the primary fuel mainfold formed by the groove 18 and ring 12 by a conduit 40. Oxidizer is transmitted from a supply to the primary oxidizer manifold formed in a manner similar to the fuel manifold by a conduit 42.

Here again, as seen in FIG. 1, transverse passages 30 and 32 extend through the body 24 to engage the primary and secondary oxidizer manifolds. Transverse passageways 50 and 52 engage the primary and secondary fuel manifolds. Each pair of transverse passageways 30 and 32 are parallel to each other and extend in a plane perpendicular to the face of the injector. Further, in turn, each pair of transverse passage 30 and 32 are parallel to all of the others and are spaced an equal distance apart throughout the body. The transverse passageways 50 and 52 for the fuel are formed in the same manner as the oxidizer passages 30 and 32 and are spaced equidistantly between each pair of oxidizer transverse passages.

Holes 60 are drilled from the back of the injector head 1 perpendicular to the face of the injector head in a plurality of places to intersect transverse passageways 30 and 32 and stop at a point short of the face. Holes 70 are drilled from the back of the injector head 1 perpendicular to the face of the injector head in a plurality of places to intersect transverse passageways 50 and 52 and stop at a point short of the face. For each hole 60 and 70, a pattern of holes is placed to engage the face of the injector. As can be seen in FIG. 3, for the main part of the injector head, four holes 80 are connected to the end of each hole 60 and four holes 90 are connected to each hole 70. Each group of four holes 80 and 90 are arranged over the face of the injector head as a checkerboard.

With each set of four face openings or holes 80 and 90 being positioned as a checkerboard, the corner openings or holes 80 and 90 which are adjacent each other are placed at an angle to intersect over a point formed by the crossing of a line drawn through the two adjacent oxidizer holes 80 and a line drawn through the two adjacent fuel holes 90 (see FIG. 3). The passageways 80 and 90 are positioned at about a 45° angle so that the impingement results at about a 90° angle. It will also be noted from FIG. 3 that while a majority of holes 80 and 90 are in sets of four, it is necessary that around the edge some groupings be formed having one opening, two openings, and three openings.

Each hole 60 and 70 has similar pintles 100 and plugs 102 fixed therein so that only one such construction will be described. A pintle comprises an elongated member having one end 110 adapted to engage the sides of the opening between the two respective associated passageways 50 and 52 or 30 and 32, depending on whether a fuel or oxidizer construction is being considered. A narrower extension 112 containing a plurality of tubular projections 114 on the end, each adapted to be directed towards the center of an opening 80 or 90, here again, depending on whether or not a fuel or oxidizer construction is being considered, extends upwardly from the one end. The tubular projections can be attached at the end of the extension 112 by any known means. A hole extends through the pintle from the bottom of the one end to the opening through each of the cooperating tubular projections 114 at the other end.

A plug 102 is positioned in each hole 60 and 70 to engage the sides of the opening between the passageway 32 and the rear of the injector head, or passageway 52 and the rear of the injector head, depending on whether a fuel or oxidizer construction is being considered. This forms a chamber between the face of the plug and the bottom of the cooperating pintle 100 so that the fuel or oxidizer passing into the chamber will be directed through the hole extending through the pintle to the tubular projections. The tubular projections, as has been stated, have their openings directed toward the center of an opening 80 or 90 and are so constructed as to provide an ejector effect with the fluid passing around the extension 112 of the pintle to the respective opening 80 or 90. Fuel or oxidizer passes from passageways 30 or 32, around the exterior of the pintles and out the openings 80 or 90, depending on whether fuel or oxidizer construction is being considered. This specific ejector-type action is set forth in application Ser. No. 426,711 and in application Ser. No. 596,393. Flow controls are also shown.

It is to be understood that the invention is not limited to the specific description above or to the specific figures shown, but may be used in other ways without departure from its spirit as defined by the following claims.

We claim:

1. In combination, an injector head having a body, said body having an injector face, said injector face including a first and second plurality of groups of four holes positioned generally in checkerboard fashion so that each group of holes of each plurality is surrounded on four sides by groups of holes of the other plurality, means for directing one propellant through one of said plurality of groups of holes, and means for directing a second propellant through the other of said plurality of groups of holes.

2. A combination as set forth in claim 1 wherein the inner corner holes of each group of four holes of a square set of four groups of holes have their outlet flows directed so as to impinge on each other at a location spaced from the face of the injector.

3. A combination as set forth in claim 2 wherein each first and second plurality of groups have their corner holes directed so as to form an angle of approximately 45° with a line perpendicular to the face of the injector.

4. A combination as set forth in claim 1 wherein one nozzle assembly is connected to each group of four holes positioned generally in checkerboard fashion.

5. A combination as set forth in claim 4 wherein each nozzle assembly includes a pintle member fixed in said body, said pintle member having an upstanding projection with four tubular members at its upper end so positioned that each tubular member has its free end opening directed into one of the four holes of a group of four holes.

6. A combination as set forth in claim 5 wherein the means for directing one propellant through one of said plurality groups of holes includes means for directing the propellant through the extension of the pintle members to the tubular members cooperating with said holes.

7. In combination, an injector head having a body, said body having an injector face, said injector face including a first and second plurality of four-hole groups, said first plurality of four hole groups being positioned generally in checkerboard fashion with said second plurality of four-hole groups, each four-hole group of said first plurality being surrounded on each of its four sides by holes of the second plurality and each four-hole group of said second plurality being surrounded on each of its four sides by holes of the first plurality, means for directing one propellant through said first plurality of four-hole groups, and means for directing a second propellant through said second plurality of four-hole groups.

8. In combination, an injector head having a body, said body having an injector face, said injector face including a first and second plurality of four-hole groups, said first plurality of four-hole groups being positioned generally in checkerboard fashion with said second plurality of four-hole groups, the inner corner holes of each four-hole group of a square set of four groups of holes having their outlet flows directed so as to impinge on each other at a location spaced from the face of the injector, the sets of the inner corner holes forming a second checkerboard pattern, means for directing one propellant through said first plurality of four-hole groups, and means for directing a second propellant through the said second plurality of four-hole groups.

* * * * *